Oct. 2, 1934.    F. J. MAUS ET AL    1,975,367
KEYBOARD TRANSMITTER
Filed Aug. 31, 1932    2 Sheets-Sheet 1

INVENTORS
F. J. MAUS
L. W. FRANKLIN
BY Eugene C. Brown
ATTORNEY

Oct. 2, 1934.  F. J. MAUS ET AL  1,975,367
KEYBOARD TRANSMITTER
Filed Aug. 31, 1932  2 Sheets-Sheet 2

INVENTORS
F. J. MAUS
L. W. FRANKLIN
BY Eugene C. Brown
ATTORNEY

Patented Oct. 2, 1934

1,975,367

UNITED STATES PATENT OFFICE 1,975,367

KEYBOARD TRANSMITTER

Frank J. Maus, Paterson, and Lawrence W. Franklin, Delawanna, N. J., assignors to The Western Union Telegraph Company, New York, N. Y., a corporation of New York Application August 31, 1932, Serial No. 631,294

4 Claims. (Cl. 178—78)

This invention relates to a telegraph transmitting apparatus and more particularly to a keyboard transmitter of a portable nature.

The transmitting apparatus is particularly suitable for reporting political, sporting, or other news events directly from the scene of activity to newspaper offices, etc.

Such events are often held in outdoor arenas, etc., in which there is no permanent telegraph transmitting equipment. Heretofore such events have been telegraphically reported by the use of the ordinary Morse key. This requires that the reporter be an expert telegrapher, or that he have the assistance of one. The Morse transmission, moreover, is slow and requires another expert operator at the receiving end to record the news items. Simplex or start-stop telegraph equipment has not been used to any extent for such purposes, since they require elaborate preparation and installation at the source of news, of transmitting and receiving equipment of a nature which is not readily portable.

The present invention has for its object to provide a suitable transmitting instrument which may be carried by the reporter without difficulty and which may be connected in on the ordinary Morse circuit for transmitting permutation code signals to the receiving office.

Another object is to provide such apparatus by which the receiving attendant may communicate to the transmitting operator.

In accordance with the invention, permutation signals of the start-stop type may be transmitted at a relatively high speed by the reporter through the manipulation of a standard keyboard and may be recorded at the receiving office on a standard simplex printer. A skilled operator is, therefore, not required at either terminal of the circuit.

Since some means must be provided whereby the receiving office can call the reporter to give instructions from time to time, we provide a suitable break signal to indicate to the reporter when the receiving attendant desires to cut in on the line. Such instructions are ordinarily of a simple nature, such as to indicate that the receiving apparatus is in operating condition, that the last sentence is to be repeated, etc., and may be readily communicated by Morse signals, without requiring that the reporter be an experienced Morse operator. In the embodiment shown we have provided a light signal to indicate when the receiving attendant is calling and a Morse sounder by which his instructions may be received. A Morse key is also provided as part of the transmitting apparatus for use by the operator in case of failure of the simplex apparatus.

A further object of the invention is to produce such an apparatus which is light, compact and portable, weighing but a few pounds, preferably of a relatively noiseless construction. For this purpose the parts of the apparatus from which the major portion of the noise originates are enclosed in sound absorbing casings, and if desired the entire mechanism may be further enclosed in a single sound-proof covering.

The invention will be best understood by reference to the accompanying drawings, in which.

Figure 1:
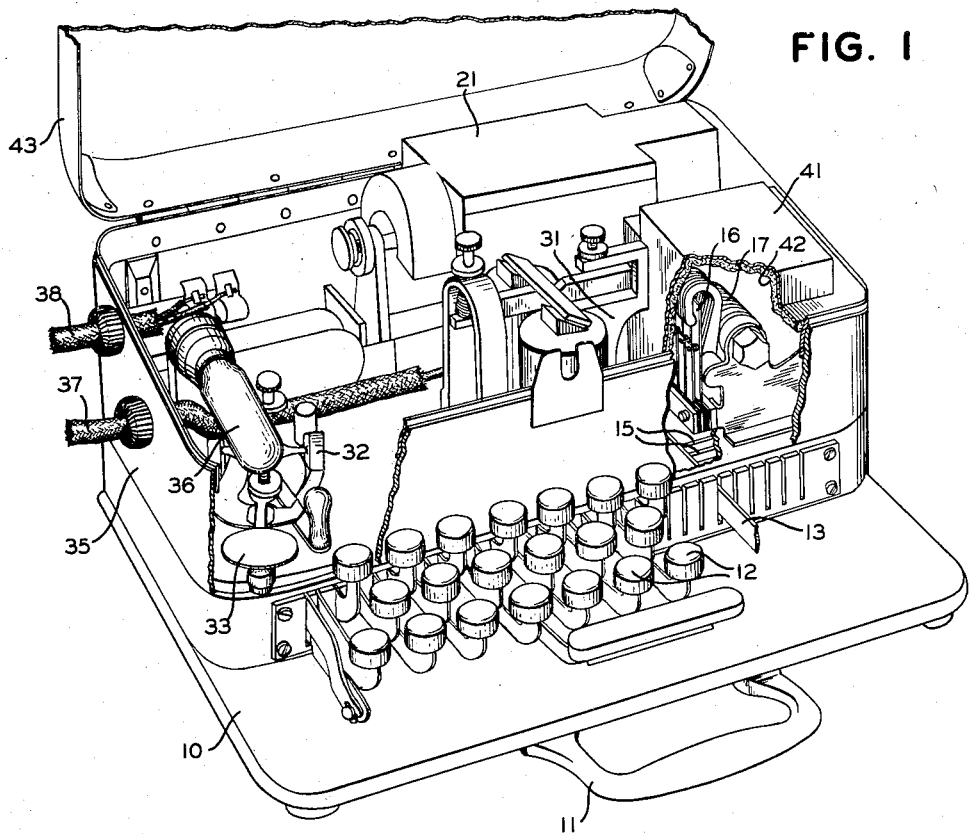
Figure 1 is a perspective view of a transmitting apparatus, embodying the present invention, with certain parts cut away to show interior constructions.
Figure 2:
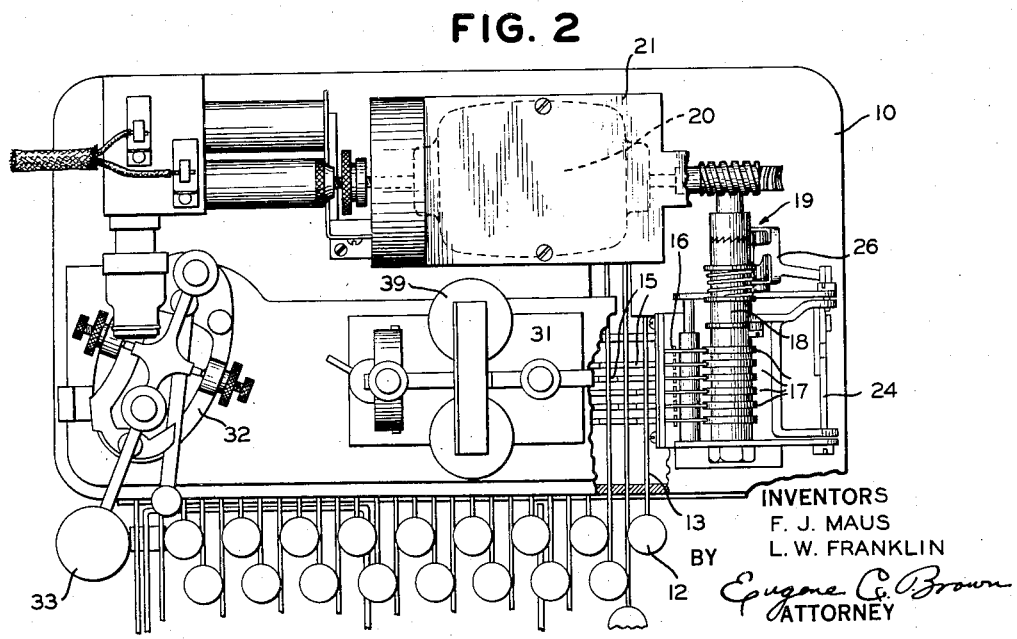
Figure 2 is a plan view of the apparatus.
Figure 3:
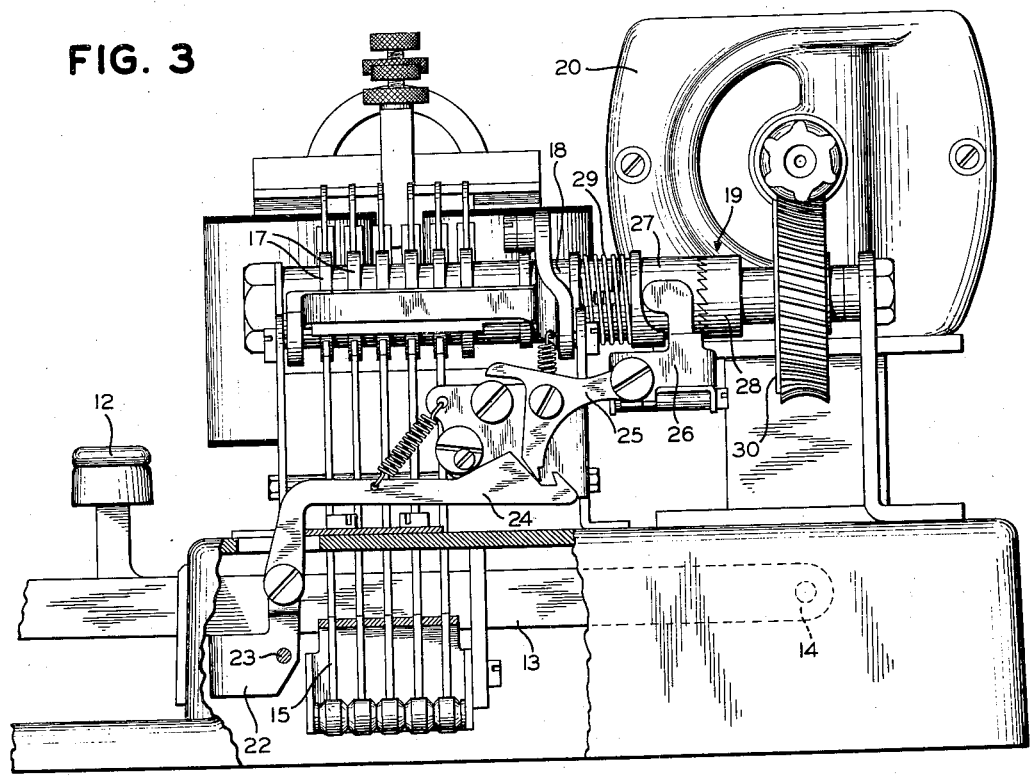
Figure 3 is a side elevation viewed from the right of Figure 2 and on an enlarged scale.

Referring first to Figure 1 in which we have shown the transmitting apparatus in perspective view. It comprises a suitable base 10 to which is secured a carrying handle 11. The transmitting apparatus is of a simplex type, including a bank of keys 12, mounted on key levers 13, pivoted at the rear of the machine at 14 (Figure 3). The key levers engage the upper sides of a group of notched code bars 15 in the usual manner to shift the same longitudinally and thereby control the making of a set of contacts 16 in a manner well known in the art and shown in detail in U. S. patent to H. L. Krum, No. 1,595,472, granted August 10, 1926, and entitled Telegraph apparatus. The contacts 16 are closed in succession, unless held open by the code bars, by individual cams 17, mounted on a cam sleeve 18, driven through a clutch 19, by a motor 20 included within a protective casing 21. Since the motor has very little work to perform, merely turning over the cam sleeve 18, it is of a light construction, and since the transmitter is designed for use wherever there is need for a reporter, the motor should be universal, that is, it should operate on either A. C. or D. C. It is provided with a suitable speed regulator (not shown) for maintaining the speed substantially the same as that of the receiving apparatus and a speed target 30 mounted on the face of the worm wheel, for setting the motor to the correct speed. The transmitting mechanism is of the start-stop type, the shaft 18 being released for one revolution upon the depression of each key lever. The key levers engage a U-shaped bail 22 (Figure 3) pivoted at 23, which draws forward a trip-off pawl 24 and by means of an intermediate pawl 25 moves the upper end of the clutch stop arm 26 away from the driven ratchet 27. This action releases the driven ratchet, which is caused to engage the driving ratchet 28 by a spring 29, permitting the sleeve 18 to make one revolution. At the end of the revolution the clutch faces are drawn apart again by the stop arm 26 engaging the cam face of the driven ratchet.

The contacts 16 are connected directly to the line circuit, as will appear subsequently, and transmit the particular permutation code combination corresponding to the depressed key, to the receiving station. Aside from the motor itself this transmitting mechanism is of standard form and by itself forms no part of the present invention.

Figure 4:
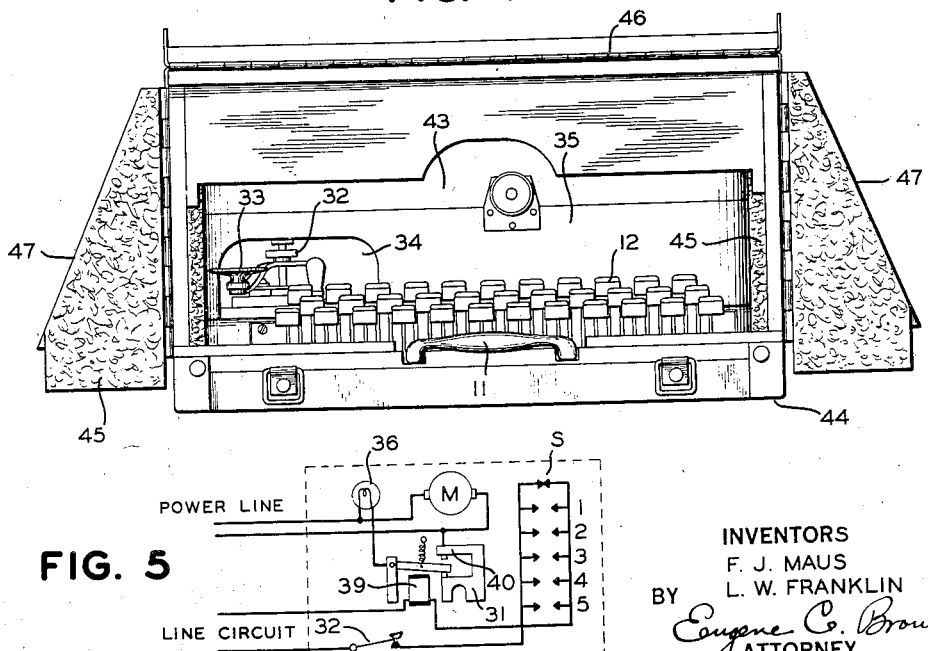
Figure 4 is a front elevation showing the mechanism enclosed in a sound-proof casing.

Also mounted upon the base 10 is a Morse repeating sounder 31 and a Morse key 32, both of standard design. The operating lever 33 of the key extends outwardly through an opening 34 (Figure 4) in the casing 35. A signal light 36 is mounted within the casing directly over the key 32 and adjacent the opening 34, whereby the light from the lamp is visible therethrough. The power supply for the operating motor 20 is provided through a cord connection 37 to the power line and the line circuit is completed to the transmitting and receiving apparatus, by a cord connection 38. Each of these cord connections are provided with suitable plugs for engaging the power and line circuit receptacles.

Figure 5:
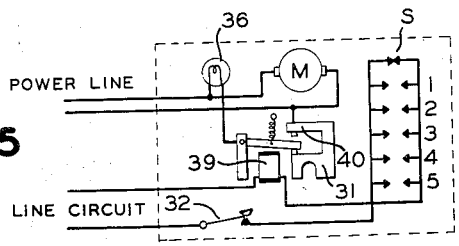
Figure 5 is a diagrammatic showing of the circuit arrangement of the transmitting, receiving, and signaling mechanism.

The circuit connections for the apparatus are shown diagrammatically in Figure 5, in which the transmitting contacts comprise a start contact S and five code contacts 1 to 5. The key 32 is normally closed, as is the start contact S, thereby completing a circuit from the line through the operating magnet 39 of the sounder 31. The motor circuit is completed directly from the power line and the lamp 36 is connected across the power line through the upper contact 40 of sounder 31.

With this arrangement when the line circuit is closed, the armature of the sounder is held away from contact 40 and the lamp 36 is extinguished. When the operator manipulates the key levers to transmit, contacts S first opens to transmit a starting signal, after which the contacts 1 to 5 are closed in succession in accordance with the code combination being transmitted. The sounder 31 attempts to follow these impulses, but since they are transmitted at a rapid rate the action of the sounder is not decisive and consequently the lamp 36 either remains extinguished or is caused to glow only faintly. If at any time the distant receiving attendant desires to break in on the line, he opens the circuit, thereby interrupting the current flow through the magnet 39 of the sounder, allowing the sounder to engage its upper contact and thereby completing the circuit to the lamp 36, which then glows brightly. The transmitting operator upon this signal ceases transmitting, so that he may hear the instructions transmitted in Morse code from the calling attendant. These instructions are received upon the sounder 31 and, as stated, since they are of a limited character they may be transmitted slowly so that the reporter need not be an experienced operator to interpret the same. If desired they may be of a pre-arranged nature, such as two dots to indicate that the receiving apparatus is an operating condition, three dots to request the retransmission of the last sentence, etc.

The key 32 is used only in emergencies when the simplex apparatus fails for any reason. Such failures are extremely infrequent and occur ordinarily through failure of the power supply for the operating motor. In such case, if the operator has even a limited knowledge of the Morse code he may transmit any important information by means of the key 32.

In order to reduce to a minimum the noise incident to the operation of the mechanism, the operating parts have been enclosed in sound deadening cases. The principal source of noise is due to the operation of the transmitting shaft and transmitting contacts. Therefore, we have enclosed the transmitting contacts 16 and cam sleeve 18 in a metallic casing 41, having a lining 42 of sound absorbing material.

The entire operating mechanism is further enclosed within the casing 35, which is provided with a hinged cover 43, the operating keys 12 and the Morse key 32 extending outwardly through the casing 35. The casing 35 is normally closed during transmission, but it may be opened to render the sounder 31 more audible when instructions are being received in Morse code.

If desired the casing 35 may be further enclosed in a sound-proof container 44 (Figure 4), lined with sound deadening and absorbing material 45. The container 44 has a front cover (not shown) hinged at 46 and two hinged side plates 47, which completely enclose the transmitting mechanism, but which may be swung back into the position shown in Figure 4, to leave the keyboard exposed, and thus to enable the transmitter to be operated.

It will be obvious that the organization shown may be embodied in other forms and that many changes may be made therein without departing from the essential attributes of the invention. Therefore, we do not desire to be limited to the particular embodiment shown, but contemplate any such changes as coming within the scope of the appended claims.

What we claim is:

1. A unitary portable telegraph apparatus comprising a permutation code transmitting apparatus, a Morse receiving instrument, a single casing enclosing said transmitting apparatus and receiving instrument, a line circuit including said transmitting apparatus and receiving instrument, and a break signal device controlled through the contacts of said Morse instrument, said signal device being substantially nonresponsive to signals transmitted by said transmitter but responding to break signals received over said line circuit.

2. A portable telegraph apparatus comprising a permutation code transmitter, a Morse transmitting key and a Morse receiving instrument, a common circuit including said transmitter, key and receiving instrument, a single casing enclosing said apparatus, and operating means for said permutation code transmitter and said Morse key, extending outwardly through said casing, said casing having a displaceable portion to render said Morse instrument audible.

3. A portable telegraph apparatus comprising a permutation code transmitter, having transmitting contact means, a sound deadening container, enclosing said contact means, a Morse receiving instrument externally of said container and a second container enclosing both the transmitting contact means and the receiving instrument, said latter casing having a displaceable portion to render said Morse instrument audible.

4. A portable telegraph transmitting apparatus comprising a permutation code transmitter, a Morse receiving instrument, a line circuit including the Morse instrument and the contacts of said transmitter, a signal circuit including the back contact of the Morse instrument, and a signal device in said circuit, said signal device being substantially non-responsive to signals transmitted by said permutation code transmitter, but responding to break signals received over said line circuit.

FRANK J. MAUS.
LAWRENCE W. FRANKLIN.